(12) United States Patent
Anissimov

(10) Patent No.: US 8,436,548 B2
(45) Date of Patent: *May 7, 2013

(54) DIMMER CONDUCTION ANGLE DETECTION CIRCUIT AND SYSTEM INCORPORATING THE SAME

(75) Inventor: Viatcheslav Anissimov, Lynn, MA (US)

(73) Assignee: Osram Sylvania Inc., Danvers, MA (US)

( * ) Notice: Subject to any disclaimer, the term of this patent is extended or adjusted under 35 U.S.C. 154(b) by 310 days.

This patent is subject to a terminal disclaimer.

(21) Appl. No.: 12/788,648

(22) Filed: May 27, 2010

(65) Prior Publication Data

US 2011/0291592 A1    Dec. 1, 2011

(51) Int. Cl.
H05B 41/36    (2006.01)

(52) U.S. Cl.
USPC ......... 315/291; 315/185 S; 315/247; 315/307

(58) Field of Classification Search ........... 315/177, 315/209 R, 224, 276, 291, 297, 299, 300, 315/301, 307, 308, 326
See application file for complete search history.

(56) References Cited

U.S. PATENT DOCUMENTS

| | | | |
|---|---|---|---|
| 5,604,411 A | 2/1997 | Venkitasubrahmanian et al. | |
| 6,229,271 B1 | 5/2001 | Liu | |
| 6,486,616 B1 | 11/2002 | Liu et al. | |
| 6,545,431 B2 | 4/2003 | Hui et al. | |
| 6,603,274 B2 | 8/2003 | Ribarich et al. | |
| 6,727,662 B2 | 4/2004 | Konopka et al. | |
| 7,075,251 B2 | 7/2006 | Chen et al. | |
| 7,259,527 B2 | 8/2007 | Foo | |
| 7,528,554 B2 * | 5/2009 | Chitta et al. | 315/291 |
| 7,852,017 B1 * | 12/2010 | Melanson | 315/291 |
| 2009/0079367 A1 * | 3/2009 | Crouse et al. | 315/307 |
| 2010/0060186 A1 * | 3/2010 | Taipale et al. | 315/291 |
| 2010/0060200 A1 * | 3/2010 | Newman et al. | 315/307 |

FOREIGN PATENT DOCUMENTS

| | | |
|---|---|---|
| EP | 1128711 A2 | 8/2001 |
| KR | 10-2009-0120044 A | 11/2009 |
| KR | 10-2009-0124728 A | 12/2009 |

OTHER PUBLICATIONS

Claudio Adranga, Design Equations of High-Power-Factor Flyback Converters Based on the L6561, STMicroelectronics Application Note AN1059, Sep. 2003, pp. 1-20.
Claudio Adranga et al., Flyback Converters With the L6561 PFC Controller, STMicroelectronics Application Note AN1060, Jan. 2003, p. 1-11.
Luca Salati, Switching From the L6561 to the L6562, STMicroelectronics Application Note AN1757, Apr. 2004, pp. 1-9.
Yeong Kyo Shin, International Search Report and Written Opinion of International Searching Authority, Nov. 30, 2011, pp. 1-6, Korean Intellectual Property Office, Daejeon, Republic of Korea.

* cited by examiner

*Primary Examiner* — Shawki Ismail
*Assistant Examiner* — Christopher Lo
(74) *Attorney, Agent, or Firm* — Shaun P. Montana

(57) ABSTRACT

A conduction angle detection circuit, and systems and methods incorporating the same, is disclosed. The circuit includes a comparator having a first input and a second input, and configured to provide a pulse-width modulated output in response to comparison of signals at the first input with signals at the second input. The output has a pulse width representative of a dimmer setting of a dimmer circuit. The circuit also includes a limiting circuit coupled to the comparator and configured to receive a rectified voltage and to provide a voltage-limited output in response to the rectified voltage to the first input of the comparator. The circuit also includes a threshold supply circuit configured to provide a threshold voltage to the second input of the comparator, and a filter coupled to the comparator. The filter is configured to convert the pulse-width modulated output of the comparator to the dimmer reference level signal.

20 Claims, 5 Drawing Sheets

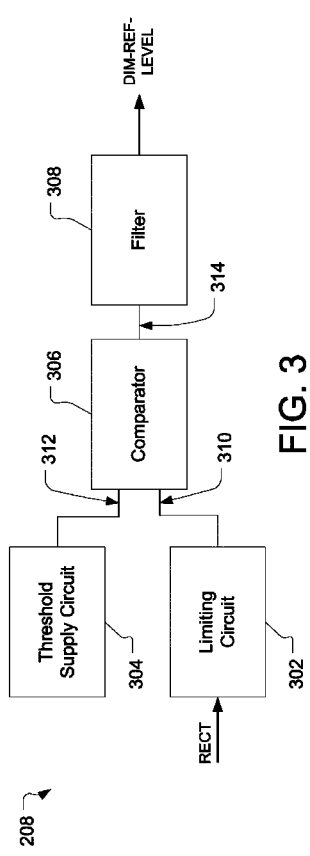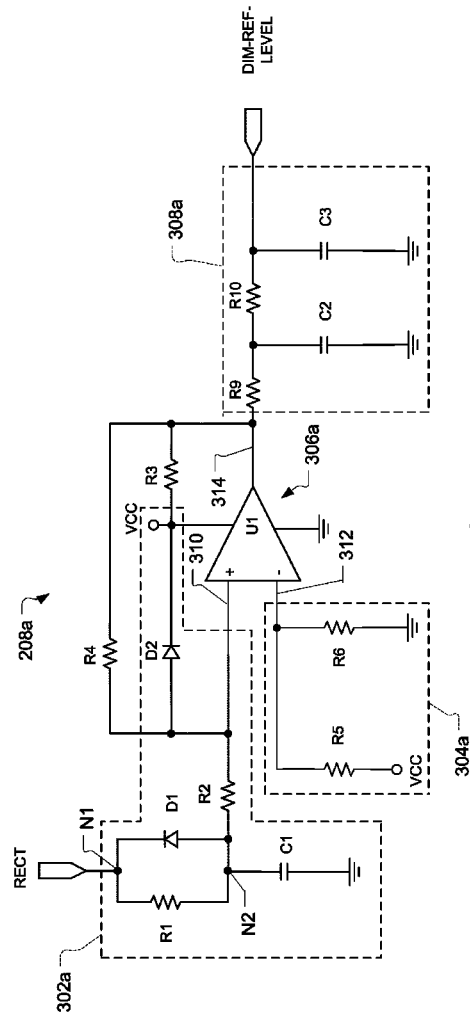

DIMMER CONDUCTION ANGLE DETECTION CIRCUIT AND SYSTEM INCORPORATING THE SAME

CROSS-REFERENCE TO RELATED APPLICATIONS

This application is related to co-pending U.S. patent application Ser. No. 12/788,629, having the same inventor, which was simultaneously filed on May 27, 2010, and is entitled "DIMMER CONDUCTION ANGLE DETECTION CIRCUIT AND SYSTEM INCORPORATING THE SAME". This co-pending application is hereby incorporated by reference in its entirety.

TECHNICAL FIELD

The present invention relates to a dimmer conduction angle detection circuit and a system incorporating the circuit.

BACKGROUND

Solid state light source based lamps (including light-emitting diode (LED) based lamps) and gas discharge lamps, such as high intensity discharge (HID) and fluorescent lamps, may be used in connection with a wide variety of applications. Such lamps are typically driven by a ballast circuit. The ballast circuit typically converts an input signal to a stable direct current (DC) or alternating current (AC) voltage used to drive the lamp. The ballast circuit may, for example, incorporate a rectifier to receive an AC input and a power conversion circuit. The power conversion circuit may receive an unregulated output from the rectifier and provide a stable, regulated output to the lamp.

When it is desired to provide an adjustable output illumination level for a lamp, a dimming control circuit may be used. The dimming control circuit may receive line voltage, e.g. from a 120VAC/60 Hz source, and provide a modified output signal to the ballast rectifier for the purpose of controlling the illumination level of the lamp. In one configuration, the dimming control circuit may be a circuit known as a "phase control" dimmer or a "phase-cut" dimmer.

In a phase control dimmer, a fraction of the input voltage sine-wave is cut in each period of the waveform, i.e. the conduction angle of the input voltage sine-wave modified. During the cut-time interval or "dead time" when the voltage is cut, the output of the phase control dimmer may be substantially zero. The residual time interval where the voltage differs from zero is known as the "dimmer conduction time." Both the dimmer conduction time and the dead time are variable, but the time period of the input voltage waveform is constant, e.g. 1/60 second in the United States. As used herein, the "dimmer setting" refers to the ratio of the dimmer conduction time to the time period of the input waveform. The dimmer setting of a phase control dimmer is controllable by a user. In one configuration, the dimmer setting may be varied from about 0.78 to about 0.25.

The ballast circuit may be configured to regulate the lamp light output in response to the dimmer setting. In one configuration, the ballast circuit may include a conduction angle detection circuit for providing an output representative of the dimmer setting to the ballast power conversion circuit. The power conversion circuit may be configured to drive the lamp to establish a lamp light output corresponding to the output of the conduction angle detection circuit.

One known phase-control dimming setting detection circuit is a simple RC filter. The rectified output of the dimming control circuit may be provided to the input of the RC filter, and the output of the filter may be a DC signal proportional to the dimmer setting signal. Although an RC filter configuration is simple, it may provide an output that is sensitive not only to the dimmer setting but also to fluctuations in the line source voltage amplitude, which may result in undesired changes in the light output at a constant dimmer setting. Also, an RC filter configuration may not provide sufficient linearity of lamp light output regulation. Another known conduction angle detection circuit incorporates a microcontroller, which adds complexity and cost to the ballast circuit.

SUMMARY

According to embodiments disclosed herein, a conduction angle detection circuit receives a rectified voltage representative of a dimmer setting and provides a voltage-limited dimmer reference level output that is proportional to the dimmer setting. The dimmer reference level output is not significantly affected by fluctuations in source/line voltage magnitude and has good linearity with respect to changes in dimmer settings. The circuit may be used with ballasts having any input voltage level.

In an embodiment, there is provided a ballast circuit to drive a light source. The ballast circuit includes: a rectifier circuit configured to receive an AC input voltage from a dimmer circuit and to provide a rectified output voltage; a power conversion circuit configured to provide a regulated output to the light source in response to the rectified output voltage and a dimmer reference level signal representative of a dimmer setting of the dimmer circuit; and a conduction angle detection circuit, the conduction angle detection circuit coupled to an output of the rectifier to receive the rectified voltage, and coupled to an input of the power conversion circuit to provide the dimmer reference level signal to the power conversion circuit. The conduction angle detection circuit includes: a comparator having a first input and a second input and configured to provide a pulse-width modulated output in response to comparison of signals at the first input with signals at the second input, the pulse width modulated output having a pulse width representative of the dimmer setting of the dimmer circuit; a limiting circuit coupled to the comparator and configured to receive the rectified voltage and provide a voltage-limited output in response to the rectified voltage to the first input of the comparator; a threshold supply circuit configured to provide a threshold voltage to the second input of the comparator; and a filter coupled to the comparator, the filter being configured to convert the pulse-width modulated output of the comparator to the dimmer reference level signal.

In a related embodiment, the first input may be a non-inverting input of the comparator and the second input may be an inverting input of the comparator. In another related embodiment, the limiting circuit may include a resistor coupled in parallel with a diode between first and second nodes, and the rectified voltage may be coupled to the first node and the second node may be coupled to ground through a capacitor and to the first input. In yet another related embodiment, the second node may be coupled to the first input through a resistor. In still another related embodiment, the first input to the comparator may be coupled to a supply voltage through a diode. In yet still another related embodiment, the threshold supply circuit may include first and second resistors provided in a voltage divider configuration, and the second input may be coupled between the first and second resistors.

In still yet another related embodiment, the filter may include a second order low pass filter configuration. In yet still another related embodiment, the ballast circuit may further include a feedback resistor coupled between the comparator output and the first input of the comparator. In still another related embodiment, the pulse width modulated signal may have a high voltage level limited to the DC value of a supply voltage to the comparator.

In another embodiment, there is provided a conduction angle detection circuit to receive a rectified voltage output of a rectifier and to provide a dimmer reference level signal representative of a dimmer setting of a dimmer circuit in response to the rectified voltage output. The conduction angle detection circuit includes: a comparator having a first input and a second input, the comparator configured to provide a pulse-width modulated output in response to comparison of signals at the first input with signals at the second input, the pulse width modulated output having a pulse width representative of the dimmer setting of the dimmer circuit; a limiting circuit coupled to the comparator and configured to receive the rectified voltage and to provide a voltage-limited output in response to the rectified voltage to the first input of the comparator; a threshold supply circuit configured to provide a threshold voltage to the second input of the comparator; and a filter coupled to the comparator, the filter being configured to convert the pulse-width modulated output of the comparator to the dimmer reference level signal.

In a related embodiment, the first input may be a non-inverting input of the comparator and the second input may be an inverting input of the comparator. In another related embodiment, the limiting circuit may include a resistor coupled in parallel with a diode between first and second nodes, the first node may be configured to receive the rectified voltage, and the second node may be coupled to ground through a capacitor and to the first input. In a further related embodiment, the second node may be coupled to the first input through a resistor.

In a related embodiment, the first input to the comparator may be coupled to a supply voltage through a diode. In another related embodiment, the threshold supply circuit may include first and second resistors provided in a voltage divider configuration, and the second input may be coupled between the first and second resistors. In still another related embodiment, the filter may include a second order low pass filter configuration. In yet another related embodiment, the conduction angle detection circuit may further include a feedback resistor coupled between the comparator output and the first input of the comparator. In still yet another related embodiment, the pulse width modulated signal may have a high voltage level limited to the DC value of a supply voltage to the comparator.

In another embodiment, there is provided a method of dimming a light source driven by a ballast. The method includes: receiving an AC source signal; modifying the AC source signal using a dimmer circuit to provide an AC signal with a dimmer setting corresponding to a desired light output level of the light source; rectifying the AC signal to provide a rectified output; coupling the rectified output to a conduction angle detection circuit, wherein the conduction angle detection circuit comprises: a comparator having a first input and a second input and configured to provide a pulse-width modulated output in response to comparison of signals at the first input with signals at the second input, the pulse width modulated output having a pulse width representative of the dimmer setting; a limiting circuit coupled to the comparator and configured to receive the rectified voltage and provide a voltage-limited output in response to the rectified voltage to the first input of the comparator; a threshold supply circuit for providing a threshold voltage to the second input of the comparator; and a filter coupled to the comparator, the filter being configured to convert the pulse-width modulated output of the comparator to a dimmer reference level signal; and coupling the rectified output and the dimmer reference level signal to a power conversion circuit configured to provide a regulated output to the light source in response to the rectified output and the dimmer reference level signal for establishing the desired light output level.

In a related embodiment, coupling may include coupling the rectified output to a conduction angle detection circuit, wherein the conduction angle detection circuit comprises: a comparator having a first input and a second input and configured to provide a pulse-width modulated output in response to comparison of signals at the first input with signals at the second input, the pulse width modulated output having a pulse width representative of the dimmer setting; a limiting circuit coupled to the comparator and configured to receive the rectified voltage and provide a voltage-limited output in response to the rectified voltage to the first input of the comparator, wherein the limiting circuit comprises a resistor coupled in parallel with a diode between first and second nodes, and wherein the rectified voltage is coupled to the first node and the second node is coupled to ground through a capacitor and to the first input; a threshold supply circuit for providing a threshold voltage to the second input of the comparator; and a filter coupled to the comparator, the filter being configured to convert the pulse-width modulated output of the comparator to a dimmer reference level signal.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 is a block diagram of a conduction angle detection circuit according to embodiments disclosed herein.

FIG. 4 is a circuit diagram of a conduction angle detection circuit according to embodiments disclosed herein.

DETAILED DESCRIPTION

In general, circuits, systems, and methods according to embodiments described herein use a conduction angle detection circuit configured to provide a voltage-limited dimmer reference level output signal to a ballast power conversion circuit that is proportional to a dimmer setting. In some embodiments, the conduction angle detection circuit may include a comparator to compare a signal representative of the dimmer setting to a threshold level. The output of the comparator may be filtered to provide a voltage-limited DC dimmer reference level output to the ballast power conversion circuit. The ballast power conversion circuit may be configured to drive a lamp in response to the dimmer reference level output to achieve a lamp light output corresponding to the dimmer setting.

Figure 1:
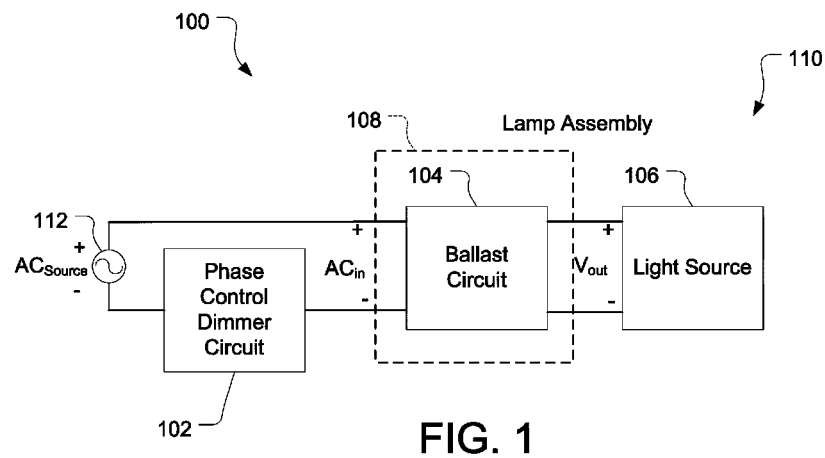
FIG. 1 is a block diagram of an embodiment as disclosed herein.

FIG. 1 is a simplified block diagram of one exemplary embodiment of a system 100. The system includes a known phase control dimmer circuit 102 coupled to a lamp assembly 110 including a ballast circuit 104 and a light source 106. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

The phase control dimmer circuit 102 may take a known configuration, such as a standard or reverse phase control dimmer provided in a wall switch, the operation of which is well-known. As described above, the phase control dimmer circuit 102 cuts a fraction of the input voltage sine-wave $AC_{Source}$ in each period of the waveform to provide an AC input $AC_{in}$ to the ballast circuit 104 having an associated dimmer setting. In some embodiments, $AC_{Source}$ may be a provided directly from a 120VAC/60 Hz line source 112. It is to be understood, however, that a system consistent with the present application may operate from other AC sources, such as a 220-240 VAC source at 50-60 Hz.

As described in detail below, the ballast circuit 104 includes a conduction angle detection circuit to provide a voltage-limited dimmer reference level output signal in response to the dimmer setting applied by the phase control dimmer. In response to the dimmer reference level output, the ballast is configured to convert the AC input voltage $AC_{in}$ to a regulated output voltage $V_{out}$ to the light source for establishing a lamp light output level corresponding to the dimmer setting. The light source may be any gas discharge lamp, such as an HID or fluorescent lamp and/or may be a solid-state-based light source, including one or more light emitting diodes (LEDs) and variations thereof (e.g., OLEDs, PLEDs, etc.). The output voltage $V_{out}$ may be an AC or DC voltage depending on the lamp configuration.

The ballast circuit 104 may be disposed within a housing 108, such as within the housing of a parabolic aluminized reflector (PAR) lamp or a compact fluorescent lamp (CFL), and the light source 106 may be electrically coupled to the ballast circuit 104 and mechanically coupled to the housing 108 to provide a lamp assembly 110. The lamp assembly 110 may be configured to mate with existing lighting fixtures, such as those configured for use with incandescent lamps, and may be inserted directly into such lighting fixtures to operate on the AC input thereto, e.g. through a dimmer circuit.

Figure 2:
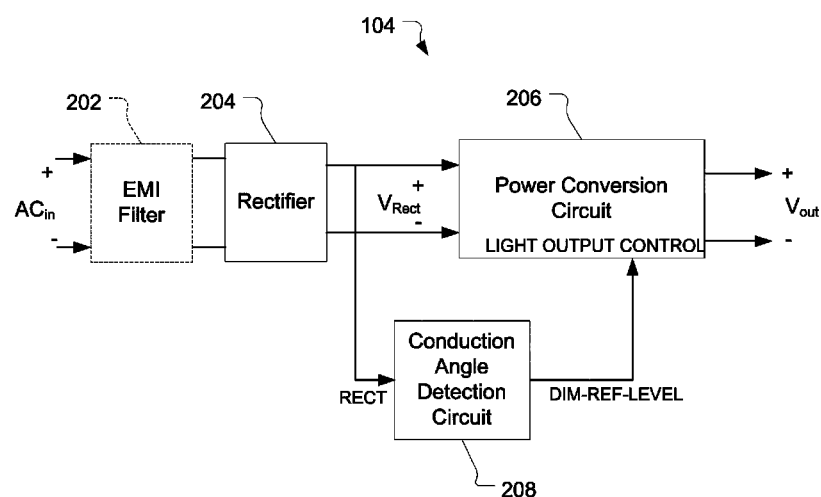
FIG. 2 is a block diagram of a ballast circuit according to embodiments disclosed herein.

FIG. 2 is a block diagram that conceptually illustrates the functionality of a ballast circuit 104. As shown, a ballast circuit 104 may include an optional electromagnetic interference (EMI) filter 202, a rectifier 204, a power conversion circuit 206, and a conduction angle detection circuit 208. In general, the AC input voltage $AC_{in}$ may be coupled to the rectifier circuit 204 through the optional EMI filter 202. The EMI filter 202 may take a known configuration, such as an inductor and/or capacitor for passing the AC input voltage $AC_{in}$ to the rectifier 204 and filtering EMI-related noise imparted to the output of the phase control dimmer circuit 102. The rectifier circuit 204 may be configured to rectify $AC_{in}$ to provide a rectified output $V_{Rect}$ that is representative of the dimmer setting applied by the phase control dimmer circuit 102. A variety of rectifier circuit configurations are well-known in the art. In some embodiments, for example, the rectifier circuit 204 may include a known bridge rectifier.

The output of the rectifier circuit 204 may be coupled to the input of the conduction angle detection circuit 208 and to the input of the power conversion circuit 206. The conduction angle detection circuit 208 is configured to receive the rectified output $V_{Rect}$ as a RECT input and provide a voltage-limited dimmer reference level output DIM-REF-LEVEL proportional to the dimmer setting signal. The DIM-REF-LEVEL level output of the conduction angle detection circuit 208 is provided to the LIGHT OUTPUT CONTROL input of the power conversion circuit 206.

The power conversion circuit 206 may be a known circuit to receive the rectified output $V_{Rect}$ and, in response to the DIM-REF-LEVEL output of the conduction angle detection circuit 208, provides a regulated output $V_{out}$ to the light source 106 configured to establish a light output level corresponding to the dimmer setting. If the dimmer setting changes, e.g. through user input, the DIM-REF-LEVEL output of the conduction angle detection circuit 208 changes correspondingly, and, in response to such change, the power conversion circuit 206 provides an output $V_{out}$ to the lamp to cause a corresponding change in the light output level of the light source 106.

In general, the power conversion circuit 206 may include known switching inverter, and the DIM-REF-LEVEL output to the power conversion circuit may control the switching frequency of the inverter to control the current output to the light source 106. One embodiment of a known power conversion circuit useful in a ballast circuit consistent with the present disclosure is described in U.S. Pat. No. 6,486,616, the teachings of which are hereby incorporated herein by reference. Other known power conversion circuits useful in a ballast circuit configuration may include known integrated circuit controllers, such as model number L6574 and L6585 controllers presently available from ST Microelectronics of Sunnyvale, Calif.

FIG. 3 is a block diagram that conceptually illustrates the functionality of a conduction angle detection circuit 208. As shown, the conduction angle detection circuit 208 may include a limiting circuit 302, a threshold supply circuit 304, a comparator 306, and a filter 308. The limiting circuit 302 may receive a RECT input from the output of the rectifier 204 and provide an output coupled to a first input 310, e.g. the non-inverting input, of the comparator 306. In general, since the RECT input to the limiting circuit 302 may be a high-voltage signal, e.g. having a peak voltage of 175V, to prevent damage to the comparator 306 the limiting circuit 302 may receive the RECT input and perform initial limiting of the output applied to the first input 310 of comparator. In some embodiments, for example, the limiting circuit 302 may limit the voltage applied to the first input 310 of the comparator 306 to a voltage approximately equal to the ballast supply voltage, $V_{cc}$. As is known, the supply voltage $V_{cc}$ for operating a ballast and the components thereof may be self-supplied in the ballast configuration to ensure a regulated, stable supply to the circuit during operation.

The threshold supply circuit 304 may provide a threshold voltage to a second input 312, e.g. the inverting input, of the comparator 306. The comparator 306 compares the voltage-limited output of the limiting circuit 302 with the threshold voltage provided by the threshold supply circuit 306, and provides a pulse-width modulated output signal having a pulse width proportional to the dimmer setting. The output 314 of the comparator 306 is also limited to a value approximately equal to the supply voltage $V_{cc}$ and is provided to the filter 308. The filter may be a known filter configured to receive the pulse-width modulated output of the comparator 306 and to provide the DC output DIM-REF-LEVEL proportional to the dimmer setting signal.

The DIM-REF-LEVEL output provided to the power conversion circuit 206 is thus voltage-limited, e.g. to a voltage approximately equal to the ballast supply voltage $V_{cc}$. This minimizes any impact of variation of in the amplitude of the rectified output $V_{Rect}$ on the DIM-REF-LEVEL output to the power conversion circuit 206. In addition, the voltage-limited DIM-REF-LEVEL output to the power conversion circuit $V_{Rect}$ is provided by a relatively simple conduction angle detection circuit 208 that does not include a complex and expensive microcontroller.

Those of ordinary skill in the art will recognize that a conduction angle detection circuit 208 as shown for example in FIG. 3 may be realized in a variety of configurations. One example of a configuration is a conduction angle detection circuit 208a, shown in FIG. 4. As shown, the conduction angle detection circuit 208a includes a limiting circuit 302a, a threshold supply circuit 304a, a comparator 306a, a feedback resistor R4, a pull-up resistor R3, and a filter 308a.

In general, the limiting circuit 302a includes resistors R1 and R2, diodes D1 and D2, and a capacitor C1. The diode D1 and the resistor R1 are coupled in parallel between nodes N1 and N2. The RECT input from the rectifier is coupled to the node N1. The node N2 is coupled to ground through the capacitor C1 and to the non-inverting input 310 of the comparator 306a through the resistor R2. The non-inverting input 310 is also coupled to the supply voltage $V_{cc}$ through the diode D2.

In operation, the RECT input to the limiting circuit charges the capacitor C1 through the resistor R1 with a time constant defined by the resistor R1 and the capacitor C1. The capacitor C1 charges until the RECT input drops low enough for the voltage across the capacitor C1 to forward bias the diode D1. When the diode D1 is forward biased, the capacitor C1 discharges through the diode D1 providing near-zero voltage at the non-inverting input 310 of the comparator 306a. The voltage at the non-inverting input 310 is limited by the diode D2. In particular, the voltage at the non-inverting input 310 forward biases the diode D2 when it exceeds the value of $V_{cc}$ added to the forward bias drop across the diode D2. This limits the voltage at the non-inverting input 310 to the value of $V_{cc}$ added to the forward bias drop across the diode D2.

The threshold circuit supply circuit 304a includes resistors R5 and R6 in a voltage divider configuration. The supply voltage $V_{cc}$ is coupled across the resistors R5 and R6, and the inverting input 312 to the comparator 306a is coupled between the resistors R5 and R6. The values of the resistors R5 and R6 thus determine the threshold voltage at the inverting input 312.

A low threshold voltage provides better accuracy in detecting the conduction and dead time of the phase control dimmer, but makes the output of the comparator 306a more sensitive to noise in the RECT input, which could cause false triggering of the comparator 306a. The capacitor C1 mitigates the effect of noise on the comparator 306a to avoid false triggering.

Although a low threshold provides more accuracy, it should be set high enough to account for residual voltage appearing at the output of the rectifier, e.g. rectifier 204. In particular, the voltage RECT at the rectifier output may not reach a zero level when the dimmer dead time is too short at a high light output level dimmer setting due to presence of a filtering capacitor at the rectifier output maintaining a residual voltage. The residual voltage may distort the voltage waveform at the output of the rectifier. As a result, the dimmer setting/conduction angle may not be detected accurately by the conduction angle detection circuit 306a, or the circuit might even skip pulses in the input voltage RECT, if the comparator threshold voltage is set too low.

The comparator 306a compares the voltage at the non-inverting input 310 and the inverting input 312 and provides a corresponding output. In particular, the comparator 306a provides a high voltage level at its output 314 when the voltage at the non-inverting input 310 has an amplitude greater than the threshold voltage at the inverting input 312, and provides a low voltage level at its output 314 when the voltage at the non-inverting input 310 has an amplitude that is less than the threshold voltage at the inverting input 312. The high voltage level output 314 of the comparator 306a is fixed and limited by the comparator to the supply voltage $V_{cc}$.

The supply voltage $V_{cc}$ is connected through the pull-up resistor R3 to pull the comparator output 314 to its high voltage level after transitioning to a low level. The feedback resistor R4 is coupled between the comparator output 314 and the non-inverting input 310 to provide hysteresis. The feedback resistor R4 also avoids jitter at the comparator output 314 when the voltage at the non-inverting input 310 is equal to the voltage at the inverting input 312.

As shown, the filter 308a includes resistors R9 and R10 and capacitors C2 and C3 provided in known second order low pass filter configuration. The filter converts the square-wave output of the comparator to the DC output DIM-REF-LEVEL.

A conduction angle detection circuit may be configured for operation with a variety of input voltages based on appropriate selection of various circuit components thereof. TABLE 1 below identifies one example of circuit components useful in configuring the embodiment 208a illustrated in FIG. 4 for operation with a 120V RMs/60 Hz AC source signal $AC_{Source}$ (resistor values in ohms):

TABLE 1

| Component | Descriptor/Value |
| --- | --- |
| VCC | 15 VDC |
| C1 | 100 pf |
| C2 | 200 nF |
| C3 | 200 nF |
| D1 | GL34J |
| D2 | 1N4150 |
| R1 | 200k |
| R2 | 100 |
| R3 | 5k |

TABLE 1-continued

| Component | Descriptor/Value |
|---|---|
| R4 | 100k |
| R5 | 5k |
| R6 | 10k |
| R9 | 47k |
| R10 | 47k |
| U1 | LM239 |

Figure 5A:
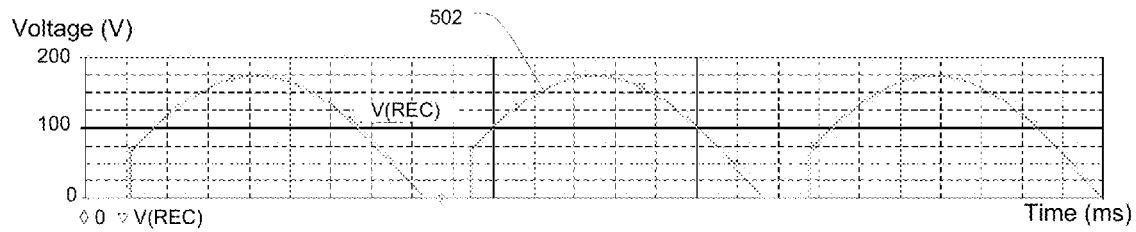
FIG. 5A includes a plot of voltage vs. time of an input voltage to the circuit shown in FIG. 4 corresponding to a dimmer setting set at a maximum light output level.
Figure 5B:
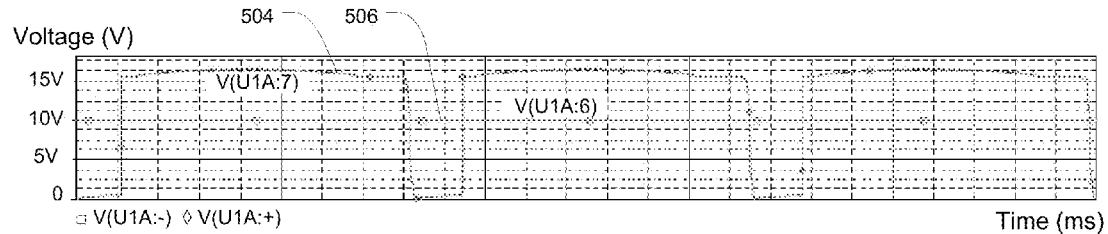
FIG. 5B includes a plot of voltage vs. time of inputs to the comparator of the circuit shown in FIG. 4 corresponding to the input voltage shown in FIG. 5A.
Figure 6A:
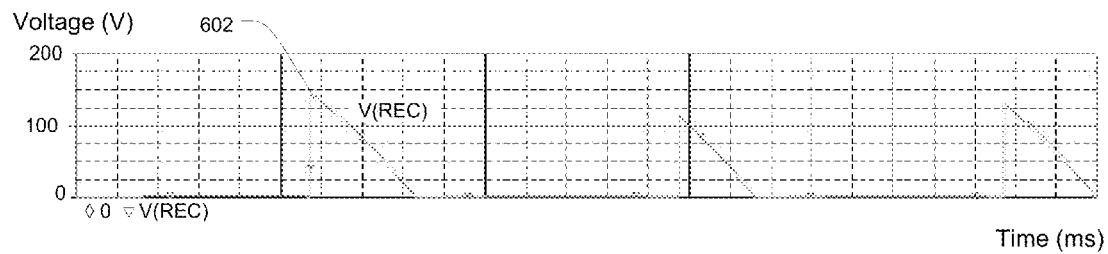
FIG. 6A includes a plot of voltage vs. time of an input voltage to the circuit shown in FIG. 4 corresponding to a dimmer setting set at a minimum light output level.
Figure 6B:
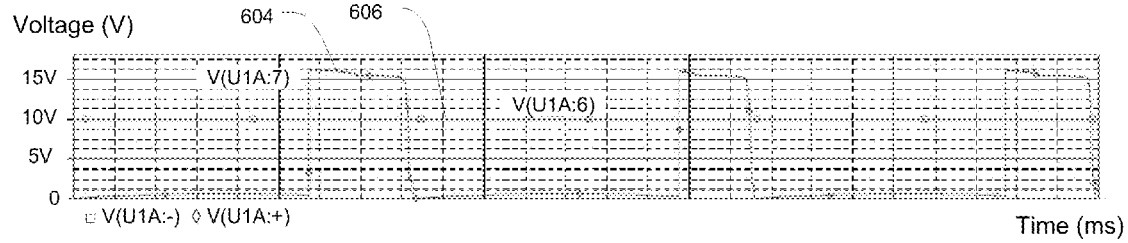
FIG. 6B includes a plot of voltage vs. time of inputs to the comparator of the circuit shown in FIG. 4 corresponding to the input voltage shown in FIG. 6A.

FIGS. 5A-5B and 6A-6B include simulated plots of the inputs to the limiting circuit 304a and the comparator 306a for the circuit shown in FIG. 4 with component values shown in TABLE 1, and for dimmer settings set at maximum and minimum light output levels, respectively. In particular, FIG. 5A includes a plot 502 of voltage vs. time of the RECT input to the limiting circuit 302a shown in FIG. 4 with a dimmer setting set at a maximum light output level. FIG. 5B includes plots 504, 506 of voltage vs. time of the inputs to the non-inverting and inverting inputs of the comparator 306a shown in FIG. 4 (i.e. the outputs of the limiting and threshold circuits, respectively) corresponding to RECT input shown in FIG. 5A. FIG. 6A includes a plot 602 of voltage vs. time of the RECT input to the limiting circuit 302a shown in FIG. 4 with a dimmer setting set at minimum light output level. FIG. 6B includes plots 604, 606 of voltage vs. time of the inputs to the non-inverting and inverting inputs of the comparator 306a shown in FIG. 4 (i.e. the outputs of the limiting and threshold circuits, respectively) corresponding to RECT input shown in FIG. 6A. In FIGS. 5A-5B and 6A-6B, the supply voltage $V_{cc}$ is set at 15VDC and the output of the threshold circuit 304a at the inverting input to the comparator is about 10VDC, as illustrated by the plots 506, 606.

As illustrated by the plots 504 and 604, in response to the RECT input the limiting circuit produces a pulse-width modulated output to the non-inverting input 310 having a pulse width proportional to the dimmer setting. When the dimmer setting is set at a maximum light output to produce the RECT input shown in the plot 502 of FIG. 5A, the output of the limiting circuit at the non-inverting input 310 of the comparator has a maximum pulse width, as shown by the plot 504 of FIG. 5B. When the dimmer setting is set at a minimum light output level, to produce the RECT input shown in the plot 602 of FIG. 6A, the output of the limiting circuit at the non-inverting input 310 of the comparator has a minimum pulse width, as shown in the plot 604 of FIG. 6B. Also, when the supply voltage $V_{cc}$ is set to about 15VDC, the output of the limiting circuit is limited to around 15.7 VDC as shown in FIGS. 5B and 6B. This protects the non-inverting input 310 of the comparator 306a from potentially damaging voltages associated with the RECT input, which in the illustrated embodiment peaks at about 175V as shown in FIG. 5A.

Figure 7A:
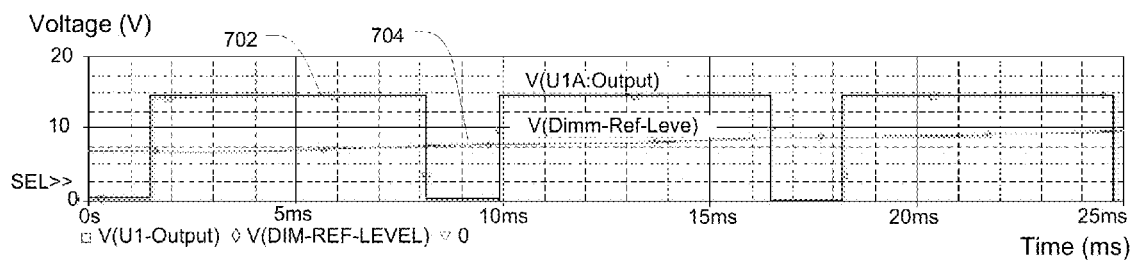
FIG. 7A includes a plot of voltage vs. time of the output of the comparator and the output of the circuit shown in FIG. 4 corresponding to the input voltage shown in FIG. 5A.
Figure 7B:
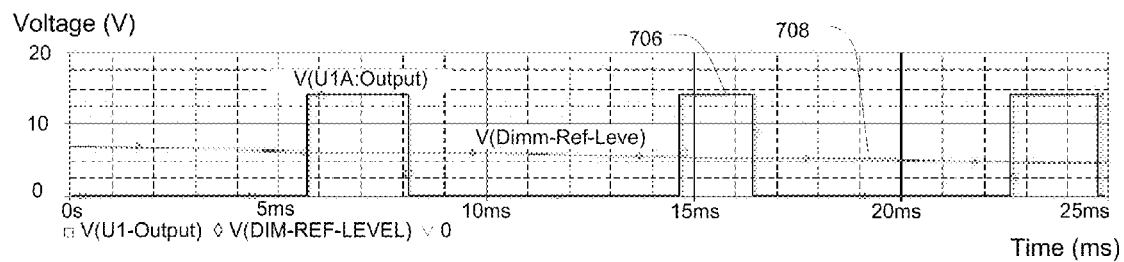
FIG. 7B includes a plot of voltage vs. time of the output of the comparator and the output of the circuit shown in FIG. 4 corresponding to the input voltage shown in FIG. 6A.

FIGS. 7A and 7B include simulated plots of the outputs of the comparator 306a and the DIM-REF-LEVEL outputs corresponding to the input waveforms shown in FIGS. 5A-5B and 6A-6B, respectively. In particular, FIG. 7A includes plots 702, 704 of voltage vs. time of the comparator output and the DIM-REF-LEVEL output, respectively with a dimmer setting signal set at a maximum light output level, as shown in FIGS. 5A-5B. FIG. 7B includes plots 706, 708 of voltage vs. time of the comparator output and the DIM-REF-LEVEL output, respectively, with a dimmer setting signal set at a minimum light output level, as shown in FIGS. 6A-6B.

As shown in the plots 702 and 706, the comparator 306a produces a pulse-width modulated output having a pulse width proportional to the dimmer setting. When the dimmer setting is set at a maximum light output level as shown in FIG. 7A, the output of comparator has a maximum pulse width, and the DIM-REF-LEVEL is about 10VDC as shown in the plot 704. When the dimmer setting is set at a minimum light output level, as shown in FIG. 7B, the output of the comparator has a minimum pulse width, and the DIM-REF-LEVEL is about 5VDC as shown in the plot 708. The conduction angle detection circuit thus produces a DIM-REF-LEVEL output to the power conversion circuit proportional to the dimmer setting (conduction angle) of the phase-control dimmer. The power conversion circuit adjusts the current output to the light source in response to DIM-REF-LEVEL output to establish a light output level corresponding to the dimmer setting.

Figure 8:
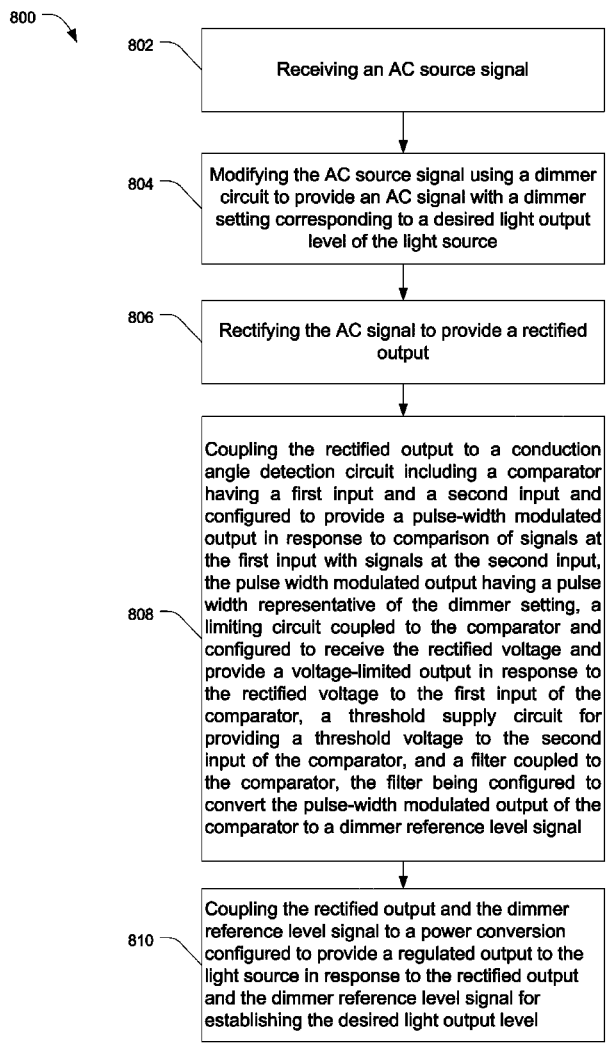
FIG. 8 is a block flow diagram of a method according to embodiments disclosed herein.

FIG. 8 is a block flow diagram of a method 800 of dimming a light source driven by a ballast consistent with the present disclosure. The illustrated block flow diagram may be shown and described as including a particular sequence of steps. It is to be understood, however, that the sequence of steps merely provides an example of how the general functionality described herein can be implemented. The steps do not have to be executed in the order presented unless otherwise indicated.

In FIG. 8, an AC source signal is received, step 802. The AC source signal is modified, step 804, using a dimmer circuit to provide an AC signal with a dimmer setting corresponding to a desired light output level of the light source. The AC signal is rectified, step 806, to provide a rectified output, and the rectified output is coupled, step 808, to a conduction angle detection circuit. The conduction angle detection circuit includes: a comparator having a first input and a second input and configured to provide a pulse-width modulated output in response to comparison of signals at the first input with signals at the second input, the pulse width modulated output having a pulse width representative of the dimmer setting; a limiting circuit coupled to the comparator and configured to receive the rectified voltage and provide a voltage-limited output in response to the rectified voltage to the first input of the comparator; a threshold supply circuit to provide a threshold voltage to the second input of the comparator; and a filter coupled to the comparator, the filter being configured to convert the pulse-width modulated output of the comparator to a dimmer reference level signal. The rectified output and the dimmer reference level signal are then coupled, step 810, to a power conversion configured to provide a regulated output to the light source in response to the rectified output and the dimmer reference level signal for establishing the desired light output level.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A ballast circuit to drive a light source, the ballast circuit comprising:
    a rectifier circuit configured to receive an AC input voltage from a dimmer circuit and to provide a rectified output voltage;
    a power conversion circuit configured to provide a regulated output to the light source in response to the rectified output voltage and a dimmer reference level signal representative of a dimmer setting of the dimmer circuit; and
    a conduction angle detection circuit, the conduction angle detection circuit coupled to an output of the rectifier to receive the rectified voltage, and coupled to an input of the power conversion circuit to provide the dimmer reference level signal to the power conversion circuit, the conduction angle detection circuit comprising:
        a comparator having a first input and a second input and configured to provide a pulse-width modulated output in response to comparison of signals at the first input with signals at the second input, the pulse width modulated output having a pulse width representative of the dimmer setting of the dimmer circuit;
        a limiting circuit coupled to the comparator and configured to receive the rectified voltage and provide a voltage-limited output in response to the rectified voltage to the first input of the comparator;
        a threshold supply circuit configured to provide a threshold voltage to the second input of the comparator; and
        a filter coupled to the comparator, the filter being configured to convert the pulse-width modulated output of the comparator to the dimmer reference level signal.

2. The ballast circuit according to claim 1, wherein the first input is a non-inverting input of the comparator and the second input is an inverting input of the comparator.

3. The ballast circuit according to claim 1, wherein the limiting circuit comprises a resistor coupled in parallel with a diode between first and second nodes, and wherein the rectified voltage is coupled to the first node and the second node is coupled to ground through a capacitor and to the first input.

4. The ballast circuit according to claim 1, wherein the second node is coupled to the first input through a resistor.

5. The ballast circuit according to claim 1, wherein the first input to the comparator is coupled to a supply voltage through a diode.

6. The ballast circuit according to claim 1, wherein the threshold supply circuit comprises first and second resistors provided in a voltage divider configuration, and wherein the second input is coupled between the first and second resistors.

7. The ballast circuit according to claim 1, wherein the filter comprises a second order low pass filter configuration.

8. The ballast circuit according to claim 1, the ballast circuit further comprising a feedback resistor coupled between the comparator output and the first input of the comparator.

9. The ballast circuit according to claim 1, wherein the pulse width modulated signal has a high voltage level limited to the DC value of a supply voltage to the comparator.

10. A conduction angle detection circuit to receive a rectified voltage output of a rectifier and to provide a dimmer reference level signal representative of a dimmer setting of a dimmer circuit in response to the rectified voltage output, the conduction angle detection circuit comprising:
    a comparator having a first input and a second input, the comparator configured to provide a pulse-width modulated output in response to comparison of signals at the first input with signals at the second input, the pulse width modulated output having a pulse width representative of the dimmer setting of the dimmer circuit;
    a limiting circuit coupled to the comparator and configured to receive the rectified voltage and to provide a voltage-limited output in response to the rectified voltage to the first input of the comparator;
    a threshold supply circuit configured to provide a threshold voltage to the second input of the comparator; and
    a filter coupled to the comparator, the filter being configured to convert the pulse-width modulated output of the comparator to the dimmer reference level signal.

11. The conduction angle detection circuit according to claim 10, wherein the first input is a non-inverting input of the comparator and the second input is an inverting input of the comparator.

12. The conduction angle detection circuit according to claim 10, wherein the limiting circuit comprises a resistor coupled in parallel with a diode between first and second nodes, the first node being configured to receive the rectified voltage, and the second node being coupled to ground through a capacitor and to the first input.

13. The conduction angle detection circuit according to claim 12, wherein the second node is coupled to the first input through a resistor.

14. The conduction angle detection circuit according to claim 10, wherein the first input to the comparator is coupled to a supply voltage through a diode.

15. The conduction angle detection circuit according to claim 10, wherein the threshold supply circuit comprises first and second resistors provided in a voltage divider configuration, and wherein the second input is coupled between the first and second resistors.

16. The conduction angle detection circuit according to claim 10, wherein the filter comprises a second order low pass filter configuration.

17. The conduction angle detection circuit according to claim 10, the conduction angle detection circuit further comprising a feedback resistor coupled between the comparator output and the first input of the comparator.

18. The conduction angle detection circuit according to claim 10, wherein the pulse width modulated signal has a high voltage level limited to the DC value of a supply voltage to the comparator.

19. A method of dimming a light source driven by a ballast, the method comprising:
    receiving an AC source signal;
    modifying the AC source signal using a dimmer circuit to provide an AC signal with a dimmer setting corresponding to a desired light output level of the light source;
    rectifying the AC signal to provide a rectified output;
    coupling the rectified output to a conduction angle detection circuit, wherein the conduction angle detection circuit comprises:
        a comparator having a first input and a second input and configured to provide a pulse-width modulated output in response to comparison of signals at the first input with signals at the second input, the pulse width modulated output having a pulse width representative of the dimmer setting;
        a limiting circuit coupled to the comparator and configured to receive the rectified voltage and provide a voltage-limited output in response to the rectified voltage to the first input of the comparator;

a threshold supply circuit for providing a threshold voltage to the second input of the comparator; and a filter coupled to the comparator, the filter being configured to convert the pulse-width modulated output of the comparator to a dimmer reference level signal; and coupling the rectified output and the dimmer reference level signal to a power conversion circuit configured to provide a regulated output to the light source in response to the rectified output and the dimmer reference level signal for establishing the desired light output level.

20. The method according to claim 19, wherein coupling comprises:

coupling the rectified output to a conduction angle detection circuit, wherein the conduction angle detection circuit comprises:

a comparator having a first input and a second input and configured to provide a pulse-width modulated output in response to comparison of signals at the first input with signals at the second input, the pulse width modulated output having a pulse width representative of the dimmer setting;

a limiting circuit coupled to the comparator and configured to receive the rectified voltage and provide a voltage-limited output in response to the rectified voltage to the first input of the comparator, wherein the limiting circuit comprises a resistor coupled in parallel with a diode between first and second nodes, and wherein the rectified voltage is coupled to the first node and the second node is coupled to ground through a capacitor and to the first input;

a threshold supply circuit for providing a threshold voltage to the second input of the comparator; and a filter coupled to the comparator, the filter being configured to convert the pulse-width modulated output of the comparator to a dimmer reference level signal.

* * * * *